US00RE40216E

(19) United States
(12) Reissued Patent
Swan

(10) Patent Number: US RE40,216 E
(45) Date of Reissued Patent: Apr. 8, 2008

(54) MODULAR SLEEVE

(76) Inventor: Richard E. Swan, 171 West St., East Bridgewater, MA (US) 02333

(21) Appl. No.: 10/811,795

(22) Filed: Mar. 29, 2004

Related U.S. Patent Documents

Reissue of:
(64) Patent No.: 6,490,822
Issued: Dec. 10, 2002
Appl. No.: 10/007,590
Filed: Dec. 10, 2001

U.S. Applications:
(60) Provisional application No. 60/274,147, filed on Mar. 9, 2001.

(51) Int. Cl.
*F41C 23/00* (2006.01)

(52) U.S. Cl. ..... 42/71.01; 42/75.01; 42/124
(58) Field of Classification Search ..... 42/71.01, 42/75.01, 124
See application file for complete search history.

(56) References Cited

U.S. PATENT DOCUMENTS

| | | | | | |
|---|---|---|---|---|---|
| 1,115,979 | A | | 11/1914 | Sillix | |
| 2,775,166 | A | | 12/1956 | Janson | 89/191 |
| 2,844,710 | A | | 7/1958 | Zinsser | 240/6.41 |
| 3,276,377 | A | | 10/1966 | Bell | 244/3.24 |
| 3,611,606 | A | | 10/1971 | Sefried | 42/1 |
| 3,939,589 | A | * | 2/1976 | Tellie | 42/71.01 |
| 4,027,414 | A | | 6/1977 | Felix | 42/1 ST |
| 4,085,511 | A | | 4/1978 | Kovac | 42/250 |
| 4,205,473 | A | | 6/1980 | Wilson | 42/1 ST |
| 4,249,315 | A | | 2/1981 | Hopson, III | 33/258 |
| 4,845,871 | A | * | 7/1989 | Swan | 42/127 |
| 5,010,676 | A | | 4/1991 | Kennedy | 42/71.01 |
| 5,062,346 | A | | 11/1991 | Greve Hansen et al. | 89/14.1 |
| 5,097,614 | A | | 3/1992 | Strong | 42/76.01 |
| 5,123,329 | A | | 6/1992 | Irwin | 89/161 |
| 5,142,806 | A | | 9/1992 | Swan | 42/101 |
| 5,343,650 | A | * | 9/1994 | Swan | 42/117 |
| 5,412,895 | A | * | 5/1995 | Krieger | 42/75.02 |
| 5,533,292 | A | * | 7/1996 | Swan | 42/123 |
| 5,533,929 | A | | 7/1996 | Attridge, Jr. | 454/369 |
| 5,826,363 | A | * | 10/1998 | Olson | 42/75.01 |
| 6,453,594 | B1 | * | 9/2002 | Griffin | 42/105 |

* cited by examiner

*Primary Examiner*—J. Woodrow Eldred
(74) *Attorney, Agent, or Firm*—Barlow, Josephs & Holmes, Ltd.

(57) ABSTRACT

A Swan universal receiver sleeve attached to the top of a firearm upper receiver and extended forward above the firearm barrel to a position just short of the firearm front sight. The underside of the rear portion of the sleeve is fixedly attached to the receiver top. The underside of the forward portion of the sleeve has an upper handguard piece attached thereto. A bottom handguard piece is fitted about the bottom of the gun barrel and is attached to the upper handguard piece. The handguard pieces are not physically connected in any way to the gun barrel. The sleeve is self supported by the connection of the rear portion underside to the receiver top.

54 Claims, 14 Drawing Sheets

(AMENDED)

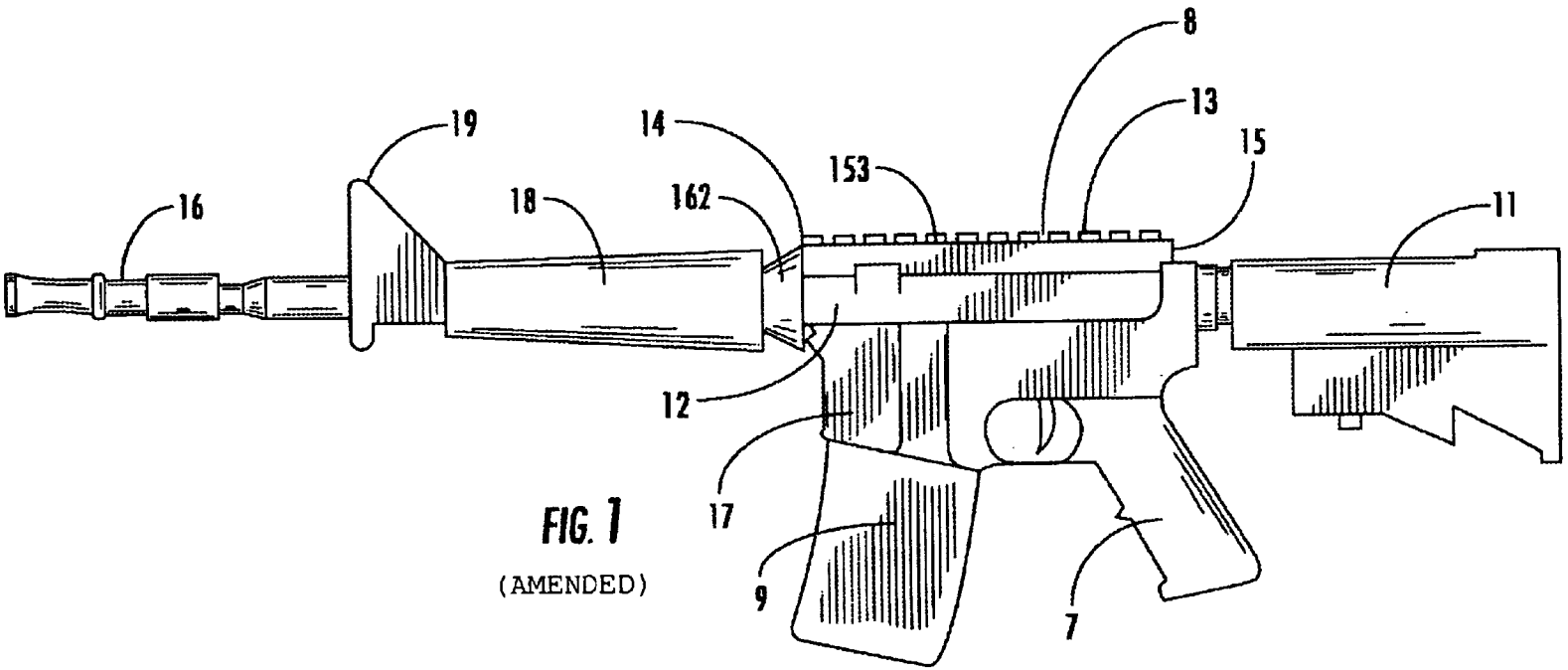
FIG. 1
(AMENDED)

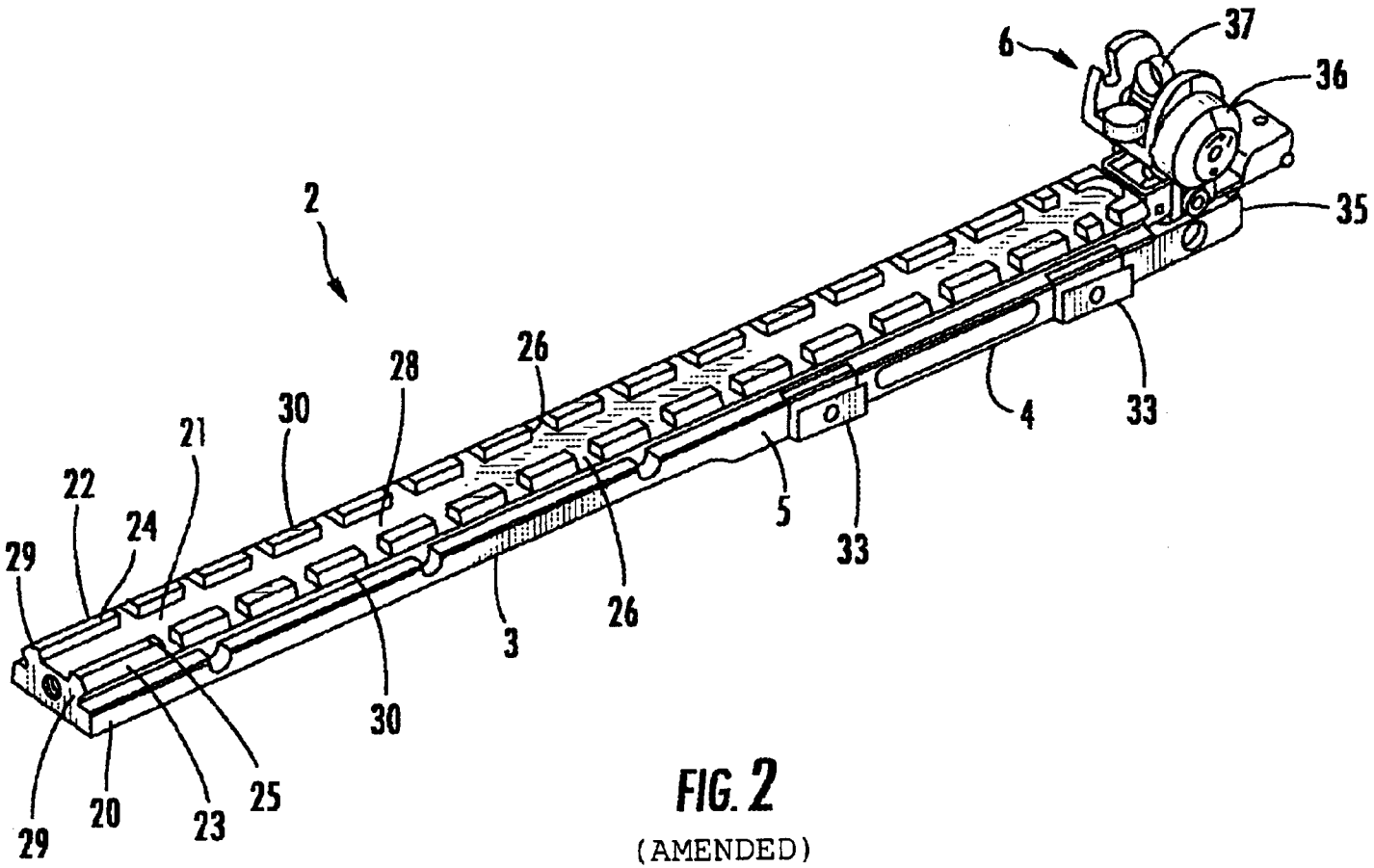
FIG. 2
(AMENDED)

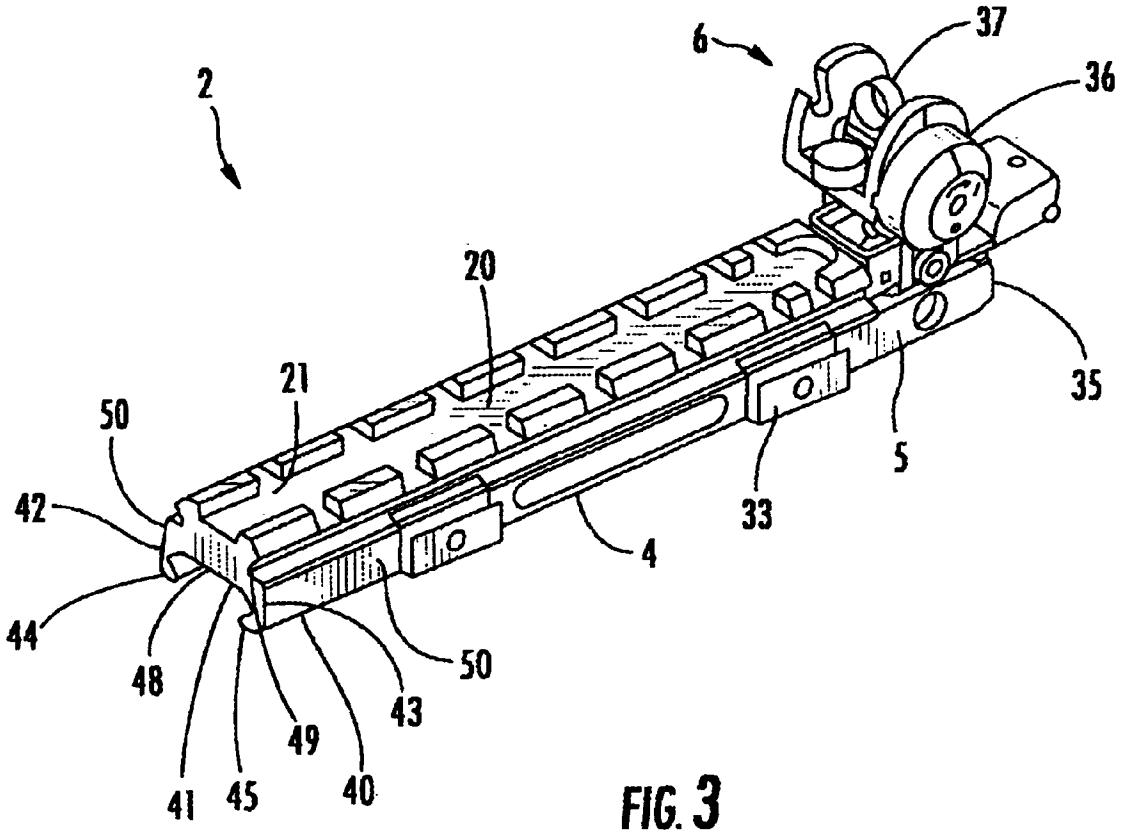
FIG. 3
(AMENDED)

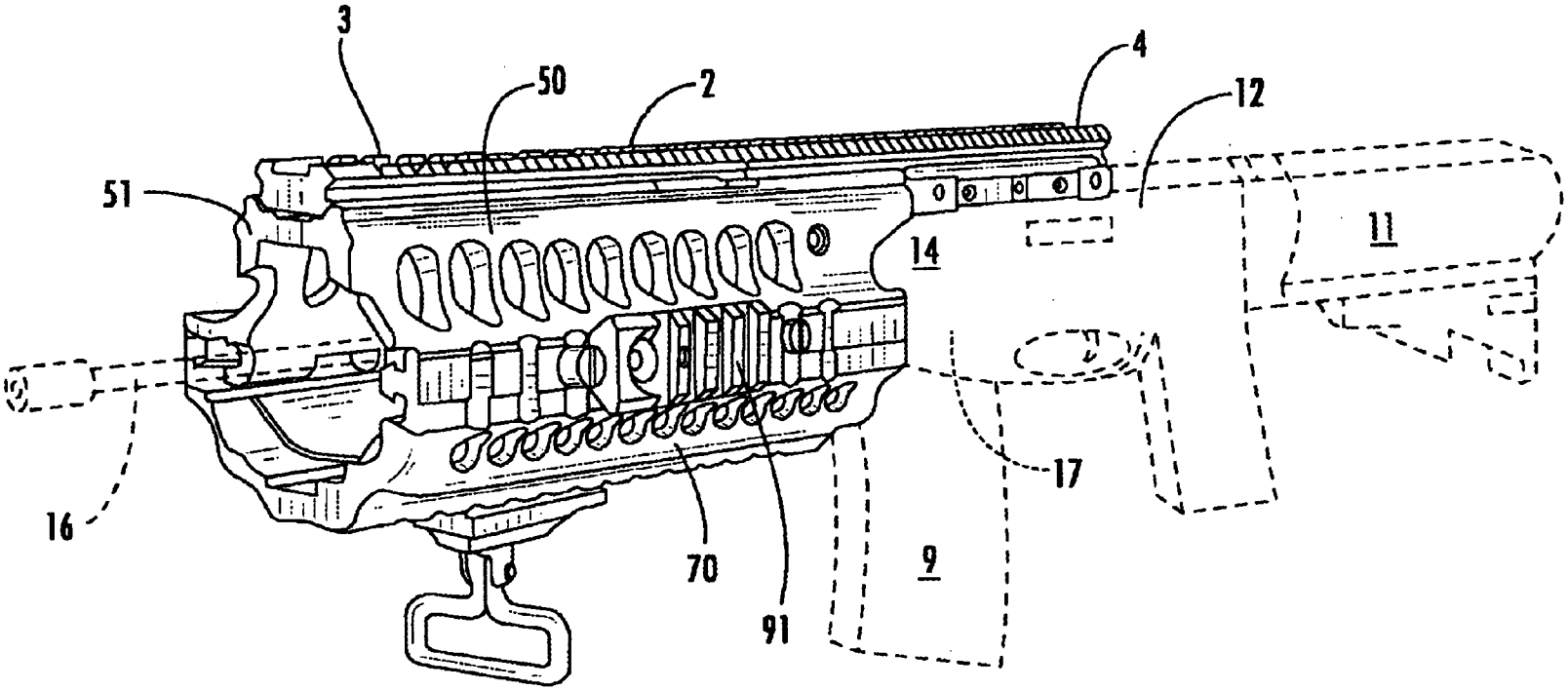
FIG. 4
(AMENDED)

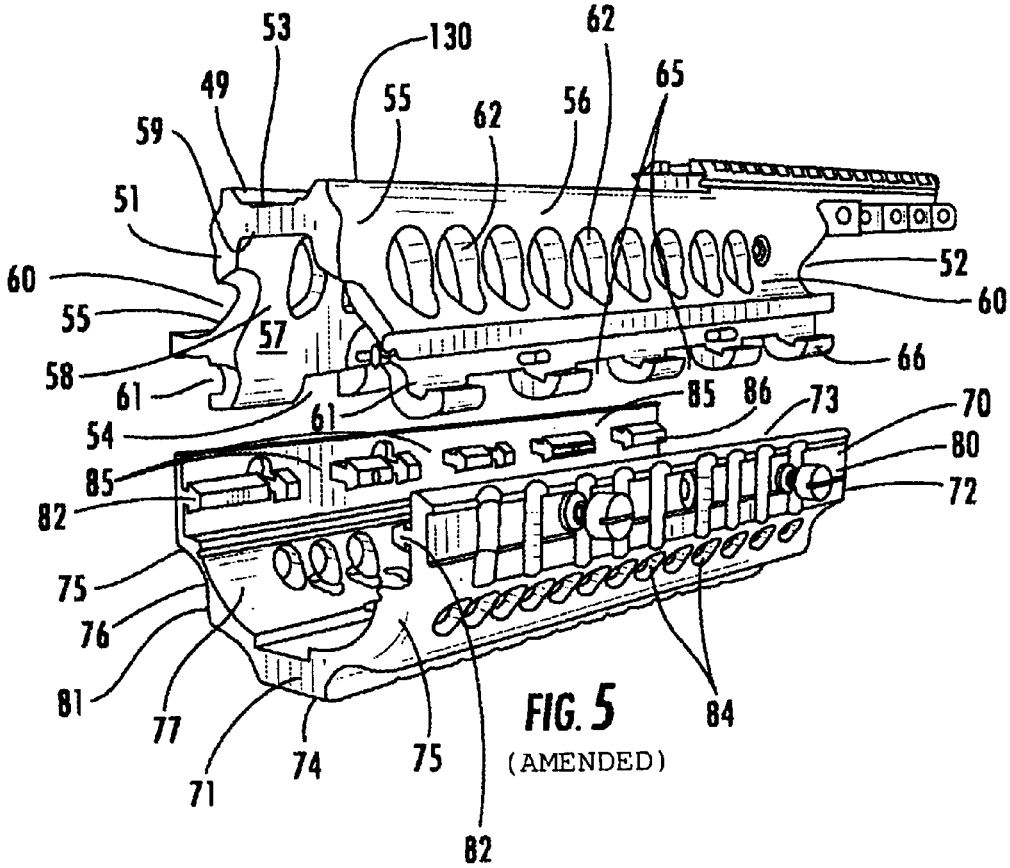
FIG. 5
(AMENDED)
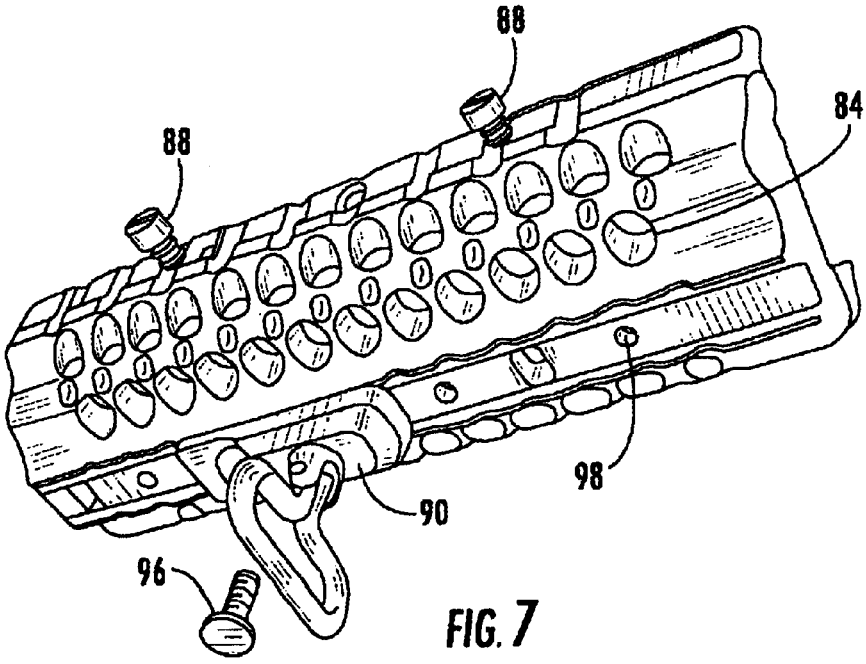
FIG. 7
(AMENDED)

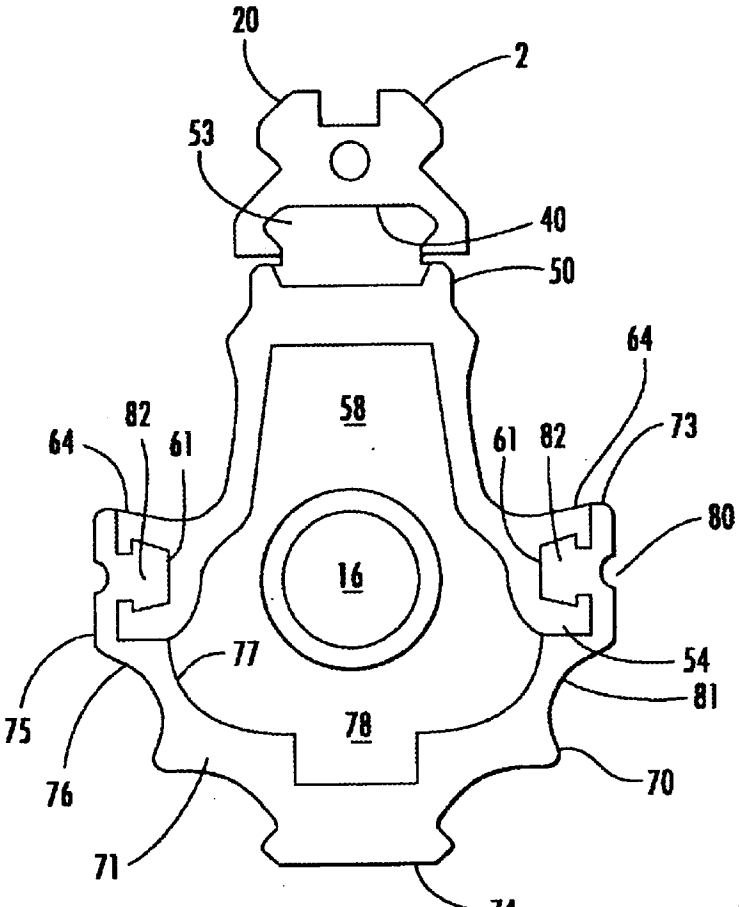
FIG. 6B
(AMENDED)
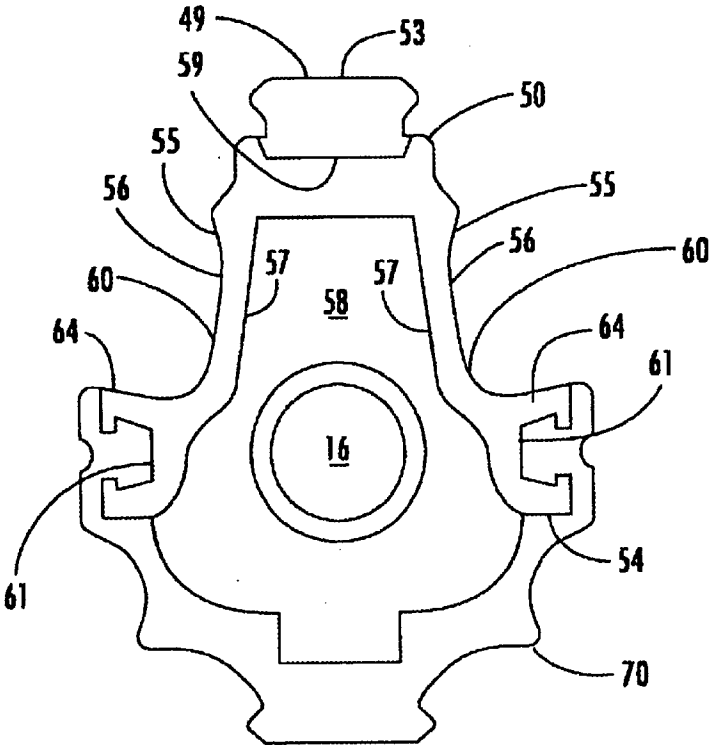
FIG. 6A
(AMENDED)

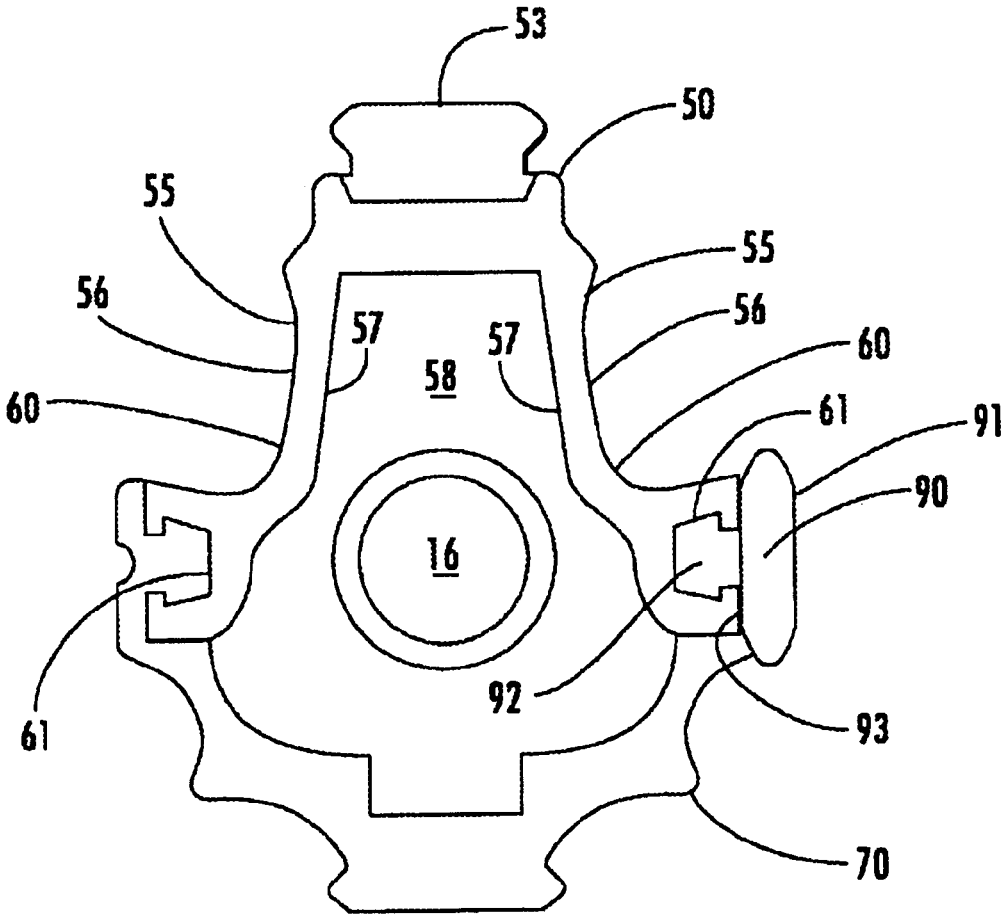
FIG. 6C
(AMENDED)

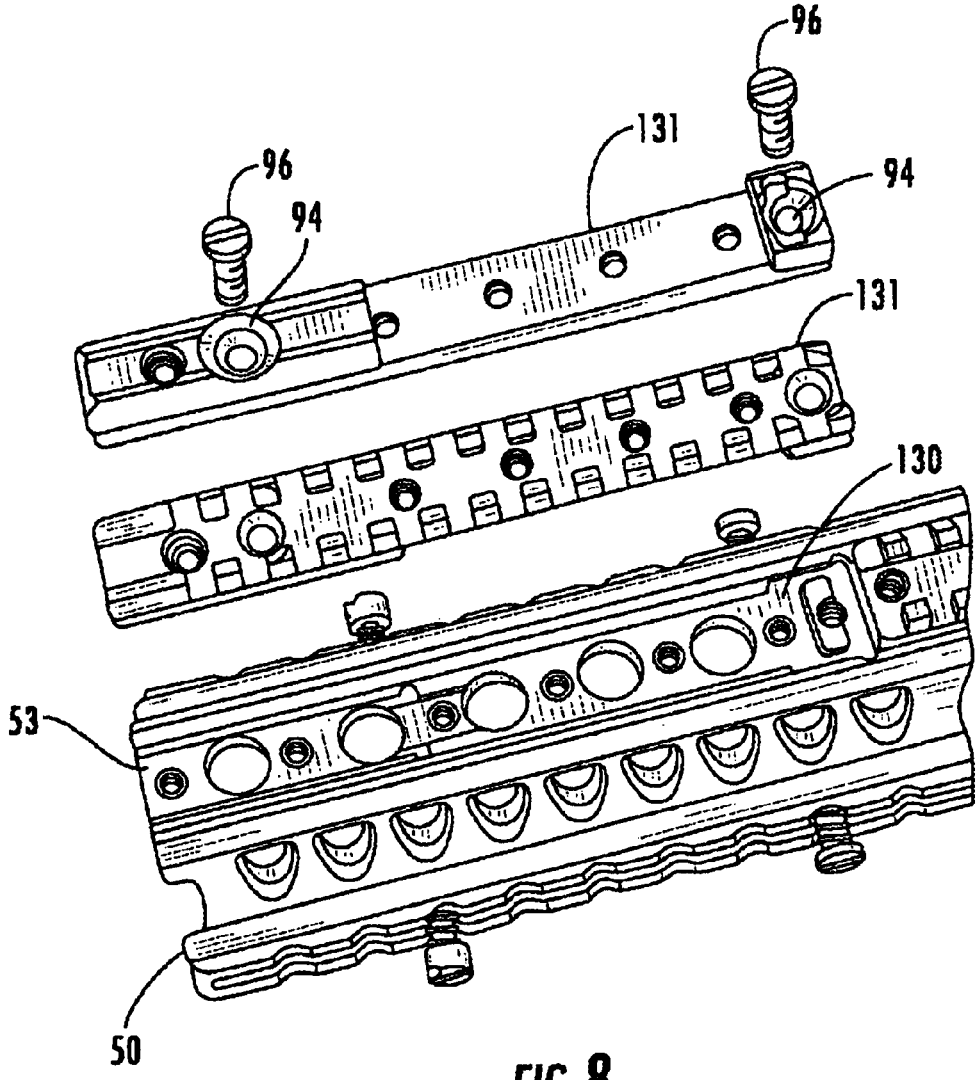
FIG. 8
(AMENDED)

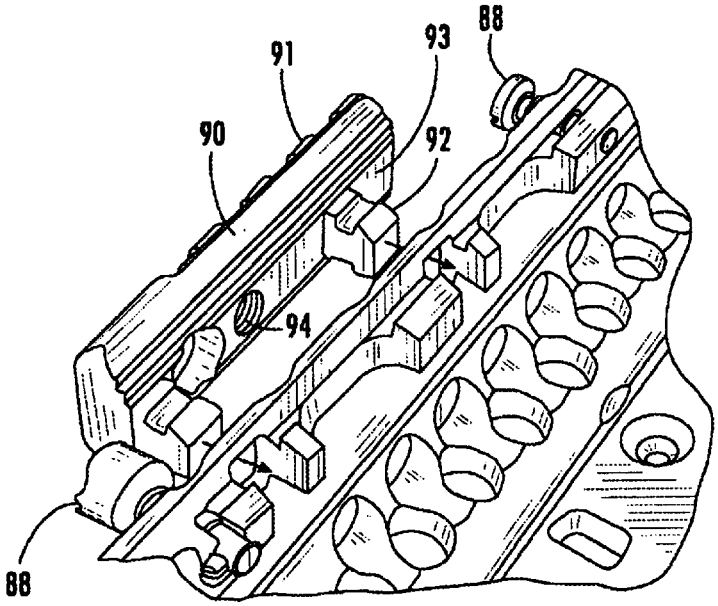
FIG. 9
(AMENDED)
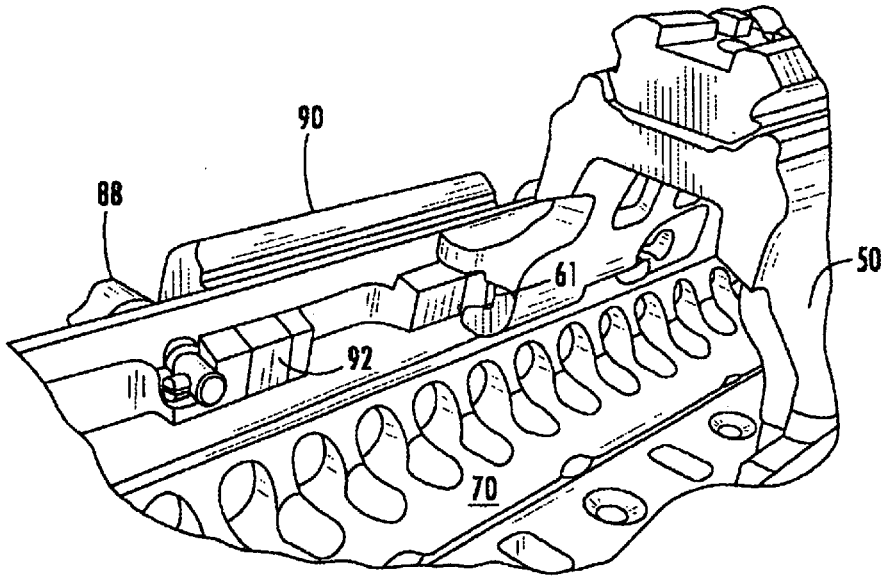
FIG. 10
(AMENDED)

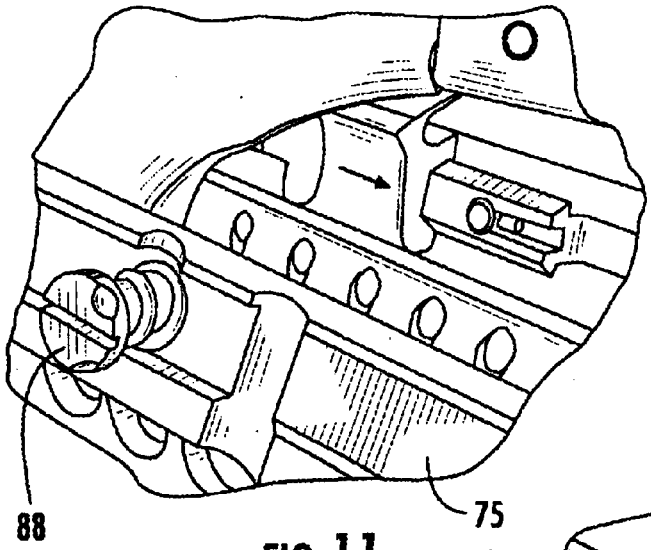
FIG. 11
(AMENDED)
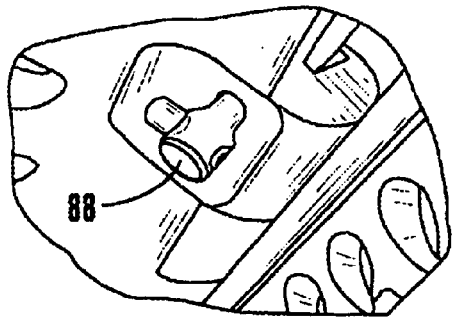
FIG. 12
(AMENDED)

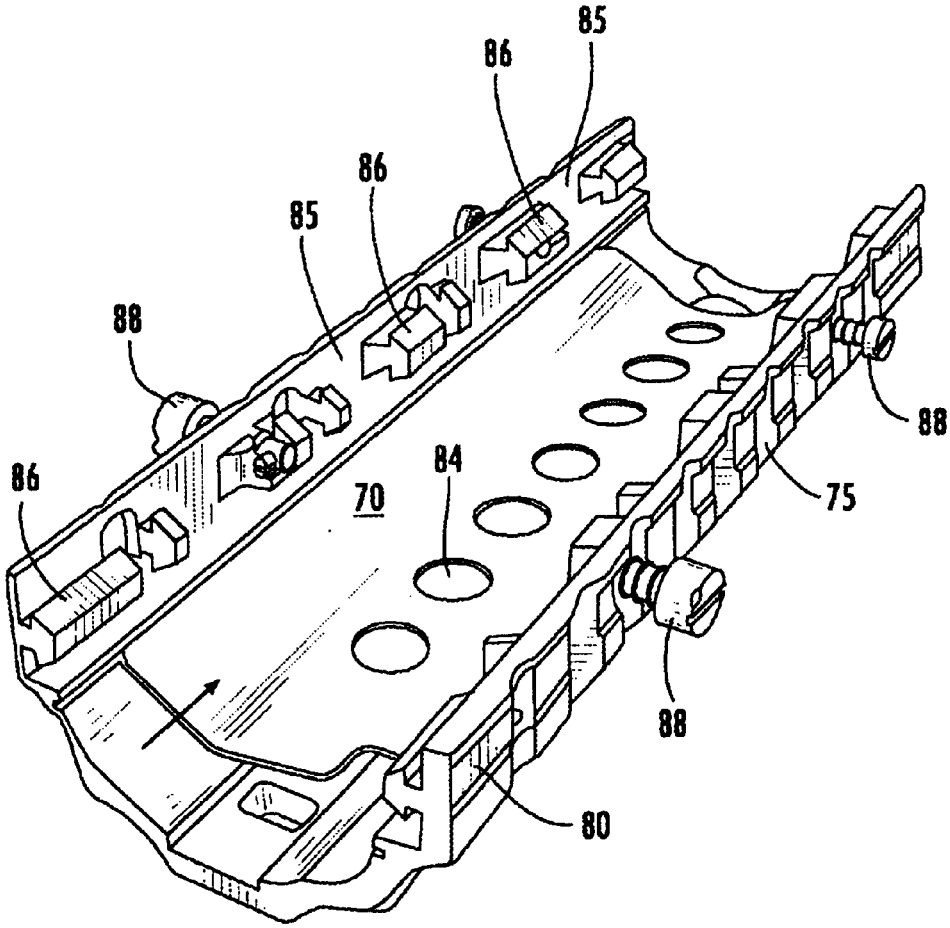
FIG. 13
(AMENDED)

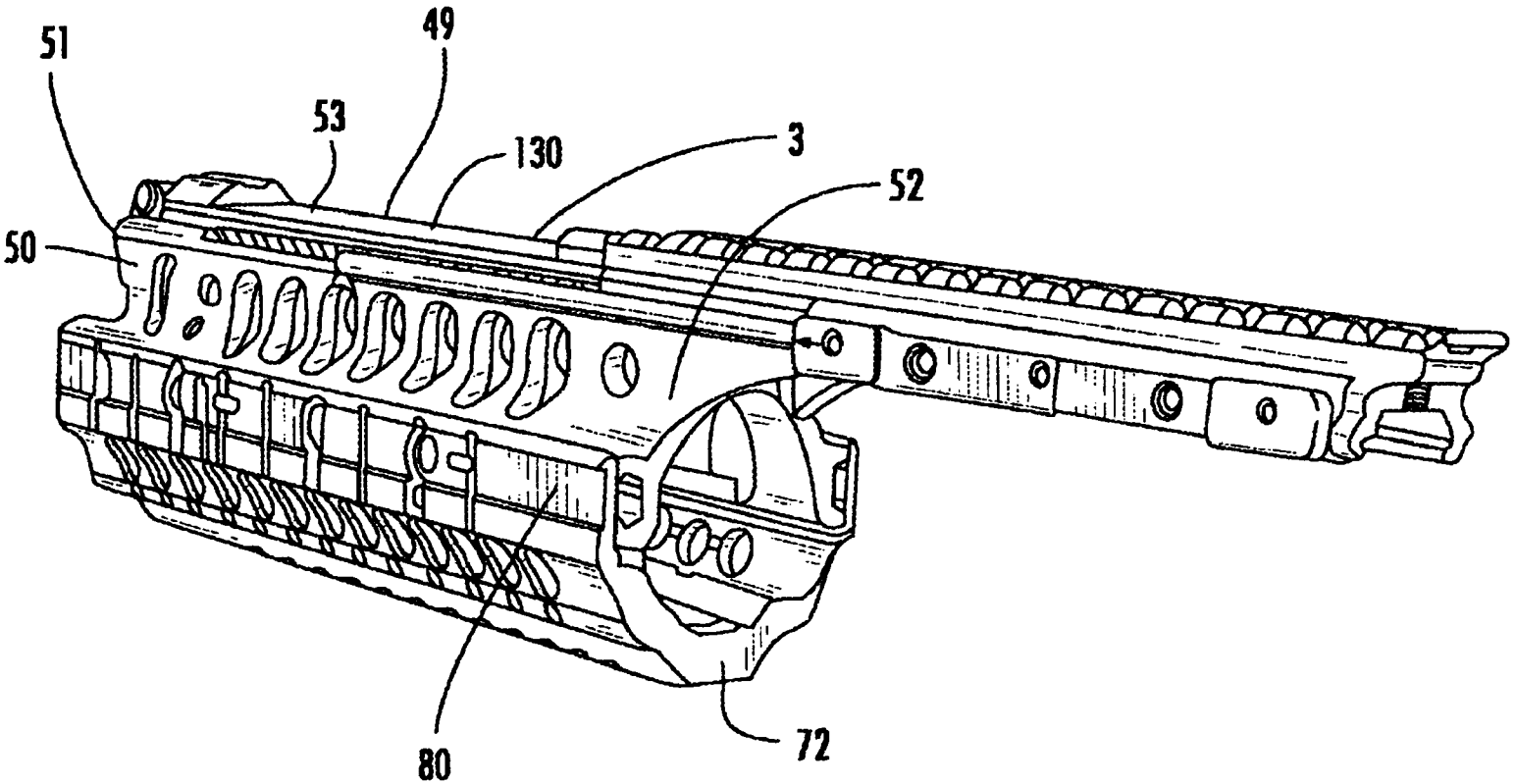
FIG. 14
(AMENDED)

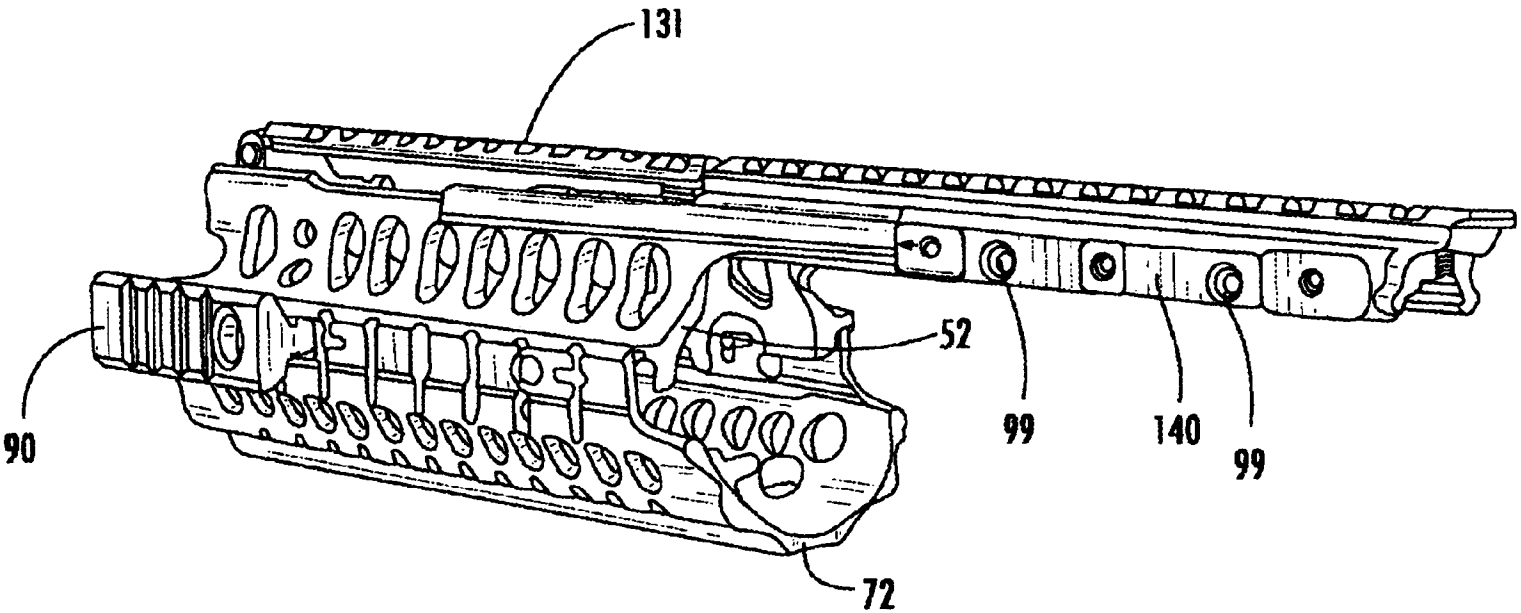
FIG. 15
(AMENDED)

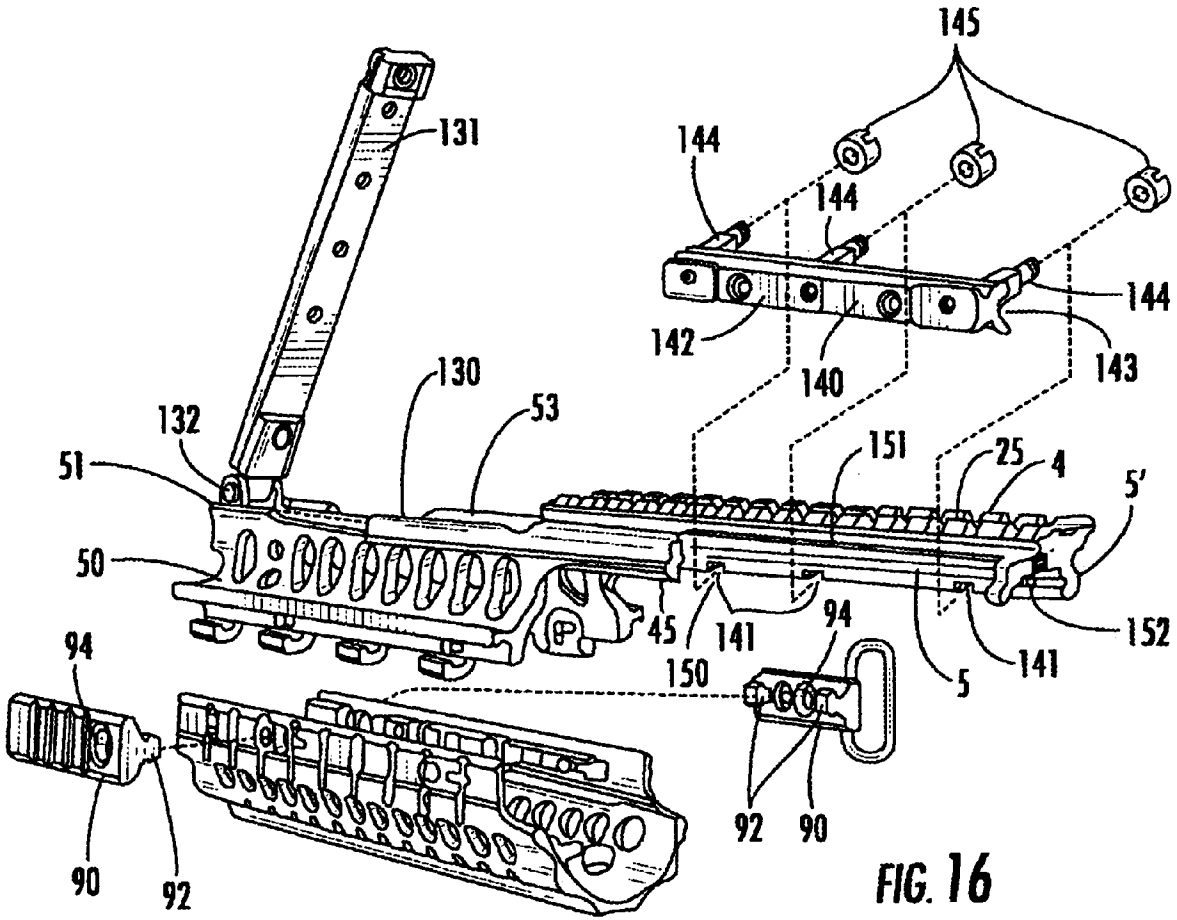
FIG. 16
(AMENDED)

MODULAR SLEEVE

Matter enclosed in heavy brackets [ ] appears in the original patent but forms no part of this reissue specification; matter printed in italics indicates the additions made by reissue.

This application claims the benefit of Provisional Application No. 60/274,147, filed Mar. 9, 2001.

BACKGROUND OF THE INVENTION

This invention relates to integration means, and more particularly to a device added to a firearm for incorporating ancillary equipment.

As the field of combat and commercial weaponry expands, numerous add-on enhancements have become available for attachment to standard firearms thereby significantly upgrading the capability of the firearm. Various methods and means have been developed for interfacing the various add-on enhancements to firearms. Applicant's U.S. Pat. No. 4,845,871, discloses a quickly detachable interface means for modular enhancements. Applicant's U.S. Pat. No. 5,142,806 discloses a universal receiver sleeve having an upper interface portion with standard, universal dimensions regardless of the firearm and having a lower interface portion specific to a particular firearm. Applicant's U.S. Pat. No. 5,343,650 discloses an extended rigid interface frame with upper and lower rails joined to a firearm receiver and extending forward about the firearm's barrel to a head assembly replacing the firearm's normal front sight. A weaver type interface return portion is provided below the barrel from the head assembly to the receiver. A yoke braces the extended rigid frame receiver sleeve of the present invention to the forward portion of the firearm's receiver. The distal end of the extended rigid frame receiver sleeve terminates in a front sight housing which connects the upper and lower rails and provides a housing for advanced laser and sensor components, and the standard front sight bead. The front sight housing is self-supported by the connection of the upper and lower rails running back to the yoke and secured to the top of the receiver. The barrel of the rifle is free floating in that it does not touch the extended rigid frame receiver sleeve in any manner. This permits greater shooting accuracy and protects sensitive electrical components within the front sight housing by isolating the front sight housing from the heat generated from the barrel. Protective spring-loaded handguards are incorporated into the extended rigid frame receiver sleeve, thereby protecting a user's hands from a hot barrel, eliminating any pressure on the barrel, and providing quick access to the barrel area.

Although the principles of the above identified patented devices are generally applicable to all firearms, the specific firearm example identified in each patent was the U.S. military M16 rifle and carbine. The M16 has been in service for a number of years and will continue to be a popular rifle both in the U.S. military and foreign military for the foreseeable future. However, with the increasing development and refinement of laser technology, it has become highly desirable to integrate laser technology capabilities onto and into firearms.

The problem with integrating laser technology to firearms is the inherent conflict between a gun barrel's physical functioning and the rigid environment required for laser operations. For maximum results, a gun barrel should be physically isolated, i.e., "floating". It is preferred that nothing be attached to the gun barrel, thereby isolating the barrel physically and eliminating bending and "droop" along the barrel's longitudinal axis. The ideal arrangement for lasers and ancillary optics and electronics is one of complete isolation from the gun barrel. The temperature of a gun barrel in use can rise to 900° F. This type of heat, as well as the physical shock on the gun barrel from firing, will quickly destroy lasers and ancillary optics and electronics.

The heat generated by the gun barrel transfers directly to any devices touching it thereby directly transferring enough heat to burn hands and destroy attached electrical devices. Further compounding this problem is the requirement that gun barrels be extra heavy to support the added weight attached by means of the collars. This in turn means more cantilevered stress on the barrel where it is joined with the M-16's aluminum receiver. The combination of heat and barrel weight tend to pull the barrel chamber out of alignment with the bolt lead, thereby causing bolt lug and extractor failure.

SUMMARY OF THE INVENTION

In view of the foregoing disadvantages inherent in the known types of devices now present in the prior art, the present invention provides a modular receiver sleeving system. As such, the general purpose of the present invention, which will be described subsequently in greater detail, is to provide a new and improved interface means for firearms which will isolate the gun barrel while providing various capabilities for mounting and integrating optics, lasers and sensors. Included in the invention capabilities are integral fastening fixtures and special contouring to facilitate internal fastening of laser housings adapted to plug into electrical sockets contained in the invention. This reduces size and eliminates exposed cables.

To attain this, the present invention extends the Swan universal receiver sleeve forward above the firearm barrel to a position just short of the firearm front sight. A weaver type interface return portion may be provided on the underside of the sleeve, or left solid over the barrel in front of the receiver to accommodate solid handguards or modular, dovetailed handguards. The underside of the rear portion of the sleeve is fixedly attached to the receiver top. The underside of the forward portion of the sleeve has an upper handguard piece attached thereto. A bottom handguard piece is fitted about the bottom of the gun barrel and is attached to the upper handguard piece via a unique channel and track system. The handguard pieces are not physically connected in any way to the gun barrel. The sleeve is self supported by the connection of the rear portion underside to the receiver top. Laser, electronics and optics modules may optionally be attached to the sleeve top side or to the upper handguard piece via special male and female dovetail track devices. The barrel of the rifle is essentially free floating. This permits greater shooting accuracy and protects sensitive electrical components integrated into and onto the firearm via the invention. Lighter weight barrels can be utilized as they are no longer deflected by outside pressure and direct transfer of heat to the hand is also eliminated.

Specifically, the present invention is a modular sleeve for interfacing modular enhancements to a firearm, said firearm having minimally a receiver with a stock and barrel attached thereto, said barrel defining the forward portion of the firearm and said stock defining the rearward portion of the firearm, said firearm longitudinal axis being defined as horizontal and running from said stock through said receiver to said barrel, said receiver having a forward portion, a top and a rearward portion, said barrel being joined to the forward portion of the receiver, said stock being joined to the rearward portion of the receiver. The modular sleeve is made up of a universal receiver sleeve having a top side, an underside and two opposite sides connecting said top side with said underside, said universal receiver sleeve being further defined as having a forward portion and a rear portion, the underside of the rear portion of the universal receiver sleeve being fixedly attached to the firearm receiver top, said receiver sleeve forward portion extended forward above the firearm barrel. The modular sleeve has an upper handguard piece with a front, rear, top, open bottom, opposing sides, outer side surfaces and inner side surfaces, said top, sides and bottom defining a hollow interior, said front and rear defining an upper handguard piece longitudinal axis, said upper handguard piece top being joined to the underside of the forward portion of the receiver sleeve. The modular sleeve also has a bottom handguard piece having a front, rear, open top, bottom, opposing sides, outer side surfaces and inner side surfaces, said bottom, sides and top defining a hollow interior, said front and rear defining a bottom handguard piece longitudinal axis, said bottom handguard piece being removably attached to the upper handguard piece. The upper handguard piece and attached bottom handguard piece surround the firearm barrel without touching said barrel.

The present invention provides a foundation for integrated laser fire control devices, sensors, communications, and a vast array of quickly attached ancillary devices, such as standard night vision, thermal, shot guns, grenade launchers, and other special systems.

The extra heavy barrels required on conventional rifles and carbines are no longer required with the present invention. A standard heavy or light weight barrel can be utilized because the present invention isolates and prevents hand, sling, and bipod pressure from deflecting the barrel. With the present invention, barrel handguards are not attached to the hot barrels, and provide a much cooler grip for the shooter. Weight reductions of at least one-half pound can be accomplished by use of a light weight barrel and the elimination of conventional solid aluminum and/or plastic handguards and their barrel hardware.

The modular sleeve is attached to the firearm upper receiver in a manner that provides a solid system, attachable or removable by a qualified armorer or a trained soldier. Greater accuracy is accomplished because the firearm has a free floating barrel with the instant invention and thereby no outside forces deflecting point of aim.

Although the invention accepts conventional laser attachments, the invention's unique integral laser housings replace the bulkiness of conventional laser housings.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

FIG. 1 is a side elevational view of a standard combat firearm.

FIG. 2 is a front perspective view of a universal receiver sleeve;

FIG. 3 is a front perspective view of the rear portion of the sleeve of FIG. 2.

FIG. 4 is a front perspective view of a modular sleeve mounted on a firearm.

FIG. 5 is a front, exploded perspective view of a modular sleeve.

FIG. 6A is a diagrammatic front view of a modular sleeve, with bottom handguard attached, positioned about a rifle barrel.

FIG. 6B is a diagrammatic front view of another embodiment of a modular sleeve, with bottom handguard attached, positioned about a rifle barrel.

FIG. 6C is a diagrammatic front view of the modular sleeve of FIG. 6A with dovetail interface element attached.

FIG. 7 is a bottom perspective view of the bottom handguard.

FIG. 8 is a top perspective view of the upper handguard piece.

FIG. 9 is a top sectional view of the bottom handguard with exploded attachment element.

FIG. 10 is a top sectional view of the bottom handguard with attachment element.

FIG. 11 is a sectional view of the interior of the bottom handguard.

FIG. 12 is a close-up view of a section of the bottom handguard.

FIG. 13 is a front, top perspective view of the bottom handguard.

FIG. 14 is a rear perspective view of the modular sleeve.

FIG. 15 is a rear perspective view of another embodiment of the modular sleeve.

FIG. 16 is an exploded view of the modular sleeve embodiment of FIG. 15.

DETAILED DESCRIPTION OF THE INVENTION

Referring to the drawings in detail wherein like elements are indicated by like numerals, there is shown in FIG. 1 an outline of a conventional combat firearm 10 having a conventional stock 11, upper receiver 12 with flat top 13, lower receiver 17, barrel 16, pistol grip 7, and magazine 9. The barrel 16 is joined to the upper receiver 12. The barrel 16 defines the forward portion of the firearm 10 and the stock 11 defines the rearward portion of the firearm 10. The longitudinal axis of the firearm 10 runs from stock 11 through receiver 12, 17 to barrel 16. The barrel 16 is joined to the forward portion 14 of the upper receiver 12, i.e., the upper receiver 12 "receives" the barrel 16. The stock 11 is joined to the rear portion 15 of the upper receiver 12. The barrel 16 has protective handguards 18 about its circumference.

The present invention provides a modular sleeve 1 about the firearm barrel 16 replacing the firearm's conventional handguards with a handguard assembly integrated into the modular sleeve 1. The present invention is anchored by the universal receiver sleeve 2 disclosed in applicant's U.S. Pat. No. 5,142,806, issued on Sep. 1, 1992, "Universal Receiver Sleeve", to Richard E. Swan, and incorporated herein by reference.

Referring more particularly to FIGS. 2 and 3, a universal receiver sleeve 2 is fully illustrated. FIG. 2 illustrates a full universal receiver sleeve 2 comprised of a front portion 3, a rear portion 4 and two sides 5. FIG. 3 illustrates the receiver rear portion 4 only. The receiver sleeve rear portion 4 only is actually joined to the upper receiver 12. The rear portion 4 is attached to the upper receiver 12 by means of one or more fasteners 33 joined through the sleeve sides 5 across the receiver top 13. The sleeve front portion 3 extends forwardly over the firearm barrel 16. The Swan sleeve 2 has a top section 20 (see FIGS. 2 and 3) and a bottom section 40 (see FIG. 3) and a longitudinal axis extending in spaced, parallel relation to the longitudinal axis of the firearm 10. The receiver sleeve top section 20 has a longitudinal, horizontally positioned base portion 21 along its length. The base portion 21 has two long side edges 29. A first longitudinal rail 22 extends upward from the base portion 21 adjacent one of the long side edges 29 and a second longitudinal rail 23 extends upward from the base portion 21 adjacent the other of the long side edges 29. The second rail 23 is in spaced parallel relationship to the first rail 22. A longitudinal opening, i.e., channel 28, is formed between the first and second rails 22, 23. The upper surface 24 of the first rail 22 lies on the same horizontal plane as the upper surface 25 of the second rail 23. Optional notches 26 may also be provided in the rails 22, 23. The notches 26 provide additional means of engaging other components. The quantity and placement of pairs of notches 26 are as required or needed. Each of the two long side edges 29 of the base portion 21 and rails 22, 23 are integral with external angled engagement surfaces 30 which extend the full length of the top section 20.

The receiver sleeve top section 20 is joined to the receiver sleeve bottom section 40. The receiver sleeve bottom section also has a longitudinal, horizontally positioned base portion 41 along its length. The base portion 41 has two long side edges 49. A first rail 42 extends downward from the base portion 41 adjacent one of the long side edges 49 and a second rail 43 extends downward from the base portion 41 adjacent the other of the long side edges 49. The second rail 43 is in spaced parallel relationship to the first rail 42. The top section base 21 is joined in a mirrored, face to face relationship to the bottom section base 41. The lower surface 44 of the first rail 42 lies on the same horizontal plane as the lower surface 45 of the second rail 43. Each of the two long side edges 49 of the base portion 41 and the rails 42, 43 are integral with an angled engagement surface 50 which extends the full length of the bottom section 40. A longitudinal resultant channel 48 is formed between the integrated rail-angled engagement surfaces 42, 50 and 43, 50. The cross section shape of the channel 48 will vary from firearm to firearm depending on the upper receiver top 13 contour of the particular firearm. The channel 48 is the interface and engagement means between the receiver sleeve 2 and the firearm 10 or the sleeve 2 and other firearm ancillary elements. The nominal cross section of the channel 48 and the cross section of the receiver sleeve top section 20 are identical. This permits complex integration of various modules to a firearm 10. In this embodiment of the invention the channel cross section provides a weaver type interface return.

The present invention provides for extension of the receiver sleeve 2 forward above the firearm barrel 16 to a position just short of the firearm front sight 19. This is the sleeve front portion 3 described above. The receiver sleeve bottom section 40 may be a weaver type interface or left solid over the barrel 16 in the receiver front portion 3 to accommodate solid handguards or modular, dovetailed handguards. The bottom section 40 of the rear portion 4 of the sleeve 2 has a weaver type interface and is fixedly attached to the receiver top 13. In the present invention the bottom section 40 of the front portion 3 of the sleeve 2 has an upper handguard piece 50 attached thereto. A bottom handguard piece 70 is fitted about the bottom of the gun barrel 16 and is attached to the upper handguard piece 50. The handguard pieces 50, 70 are not physically connected in any way to the gun barrel 16. The sleeve 2 is self supported by the joining of the sleeve rear portion 4 bottom section 40 to the receiver top 13. In another embodiment of the invention shown in FIG. 6A the top of the 53 upper handguard 50 and receiver sleeve bottom section 40 may be integrated into one piece, thereby forming a resulting upper handguard piece top 53, said resulting upper handguard piece top having an upper surface 49 and an undersurface 59. Laser, electronics and optics modules may optionally be attached to the sleeve top section 20 or to the upper handguard piece 50 via special male and female dovetail track devices. The barrel 16 of the firearm 10 is essentially free floating. This permits greater shooting accuracy and protects sensitive electrical components integrated into and onto the firearm. Lighter weight barrels can be utilized as they are no longer deflected by outside pressure and direct transfer of heat to the hand is eliminated.

As may also be seen in FIGS. 2 and 3, in practice, the receiver sleeve rear portion 4 would incorporate a standard non-optical, flip up sight 6 at the rear 35 of the receiver top section 20. Windage and elevational adjustments 36 and 37 may also be included. Although for illustrative purposes the flip up sight 6 is not shown in the modular sleeve figures, as a desired feature, a flip up sight would normally be included with the modular sleeve 1.

Referring more particularly to FIGS. 4–16, the upper handguard piece 50 has a front 51, rear 52, top 53, open bottom 54, opposing sides 55, outer side surfaces 56 and inner side surfaces 57, said top 53 and sides 55 defining an interior 58. The front 51 and rear 52 define the upper handguard piece's longitudinal axis. The top 53 may be formed into a male weaver type interface. Each of the upper handguard side outer surfaces 56 have two longitudinal channels formed therein, i.e., a large and shallow upper channel 60 and a bottom interface channel 61. The concave shape formed in the upper handguard piece by the channel 60 permits heat to escape faster from the weapon barrel area. The channel also permits ancillary equipment to be placed closer to the center line of the barrel bore. The bottom interface channel 61 is positioned near to the bottom 54 and has a general female, T-shaped cross section.

The bottom handguard piece 70 has a front 71, rear 72, open top 73, bottom 74, opposing sides 75, outer side surfaces 76 and inner side surfaces 77, said bottom top 74 and sides 75 defining an interior 78. The front 71 and rear 72 define the bottom handguard piece's longitudinal axis. The bottom 74 may be formed into a male weaver type interface. Each of the bottom handguard side outer surfaces 76 have two longitudinal channels formed therein, i.e., a small and shallow upper channel 80 and a larger, shallow bottom channel 81. The channels 80, 81 provide hand gripping means for a user.

The upper handguard rear 52 and bottom handguard piece rear 72 may be shaped to accommodate various firearm barrel-receiver connection means. FIG. 14 illustrates an example of a military application, while FIG. 15 illustrates a commercial application.

The bottom hand guard inner side surfaces 77 each have a longitudinal T-shaped protrusion 82 position near to the top 73, each protrusion being a mirror of the other. The bottom handguard piece 70 is adapted to being joined to the upper handguard piece 50 by sliding the bottom handguard longitudinal T-shaped protrusion 82 into the upper handguard bottom interface channel 61.

Referring more particularly to FIGS. 9–13, spring-loaded connectors 88 are inserted through the bottom handguard piece sides 75 to hold the handguard pieces 50, 70 in proper alignment, Apertures 62 may be formed in the upper handguard shallow upper channel 60 for heat ventilating purposes. The upper handguard rear 52 may also be tapered back toward the top 53 to add strength to the invention. Apertures 84 may also be formed in the lower handguard lower channel 81 for heat ventilating purposes.

Referring particularly to FIGS. 6A and 6B, the lower handguard piece left and right T-shaped protrusions 82 engage the upper handguard piece bottom interface channels 61. In one embodiment of the invention, the bottom handguard piece 70 is positioned fully to the upper handguard piece front 51 and then brought back rearwardly in order to have the lower handguard piece left and right T-shaped protrusions 82 engage the upper handguard piece bottom interface channels 61. To eliminate this requirement, the invention embodiment shown provides for an interrupted interface railing system comprised of cutout portions 65, 85 in the upper handguard interface channel 61 and bottom handguard upper channel 80. Each remaining stud 66, 86 of the interface channel 61 and channel 80 is a nominal ¾ inch in longitudinal length. The cutout portions 65, 85 are also a nominal ¾ inch in longitudinal length. This allows the lower handguard piece 70 to be placed a nominal ¾ inch forward of and in alignment with the upper handguard piece 50. The lower handguard piece 70 is then pulled back rearwardly ¾ inch. The studs 66, 86 then fully engage and lock into one another.

Referring more particularly to FIGS. 5, 6A, 6B, 8, and 14–16, the upper handguard piece top 53 and/or receiver sleeve front portion 3, may have a longitudinal gap 130 formed therein. This permits the direct attachment of various aiming, optical and directed energy devices to the upper handguard top 53, or the attachment of various interface longitudinal elements 131 adapted and configured to join various aiming, optical and directed energy devices to the modular sleeve upper handguard piece top 53. See FIG. 8. The gap 130 provides room to compensate for various height requirements for the various devices. The gap 130 is most clearly shown in FIG. 14. An interface element 131 attached to the gap 130 is most clearly shown in FIG. 15. In another embodiment of the invention shown in FIG. 16, a hinging element 132 is fixed to the upper handguard piece top 53 at the front 51 and is adapted to pivotally join an interface element 131 which may have different attachment configurations on each surface.

Referring more particularly to FIGS. 6C, and 9–13, the modular sleeve is further enhanced wherein several of the studs 86 of the bottom handguard piece 70 are reduced in longitudinal length to a nominal ½ inch. This permits engagement of an external dovetail interface element 90. Each external dovetail interface element 90 has an exterior horizontal surface 91 with a cross-sectional dovetail shape adapted to attach ancillary equipment, and an opposite, generally flat, interior surface 93 having one or more T-shaped protrusion 92 adapted to engage the cutout portions 85 of the lower handguard upper channels 80 and come into alignment with the studs 86 for engagement with the upper handguard interface channel 61. Any number of studs 86 may be modified in any nominal longitudinal length to accommodate dovetail interface elements 90 of varying lengths. The dovetail interface elements 90 also have one or more apertures 94 formed therethrough, said apertures 94 adapted to receive a screw 96. The screw 96 enables a dovetail interface element 90 to be engaged directly to the modular sleeve 1 at one of the apertures 98 formed directly at various points in the modular sleeve 1. The modular sleeve apertures 98 may have helicoils 99 inserted therein to provide threaded engagement with a screw 96.

The receiver top 13 has a plurality of notches 8 formed thereon, each said notch 8 having a rectangular cross section and are formed transverse to the longitudinal axis of the firearm 10. The universal receiver sleeve 2 has an elongated rectangular opening 150 formed in a first universal receiver sleeve opposite side 5, said rectangular opening 150 extending from the universal received sleeve opposite side lower surface 45 a predetermined distance toward the universal receiver top side 25 terminating in a rectangular opening upper edge 151, said rectangular opening upper edge having a plurality of rectangular notches 141 formed therein. The second universal receiver sleeve opposite side 5' has a plurality of apertures 152 formed therein, each said aperture 152 being formed directly opposite a first universal received sleeve opposite side rectangular notch 141.

A sleeve dovetail interface element 140 is provided for engagement with the universal receiver sleeve rear portion 4. The sleeve dovetail interface element 140 has an exterior horizontal surface 142 with a unique cross-sectional dovetail shape adapted to attach ancillary equipment, and an opposite interior surface 143 with a standard dovetail configuration for securing the universal receiver sleeve rear portion 4 to the receiver top 13. There are a plurality of projecting elements 144 formed on the sleeve dovetail interface element interior surface 143, each said projecting element 144 having a rectangular cross-section, said projecting elements 144 adapted to engage the notches 8 across the receiver top 13. The sleeve dovetail interface element interior surface 143 is adapted to engage said universal receiver sleeve opposite side elongated opening 150 and a side 153 of said receiver top 13. The sleeve dovetail interface element interior surface projecting elements 144 are adapted to engage the elongated rectangular opening rectangular notches 141, the receiver top notches 8 and the apertures 152 in said second received sleeve opposite side 5'. Special nuts 145, each adapted to engage a portion of a sleeve dovetail interface element interior surface projecting element projecting through each aperture 152 are also provided. The sleeve dovetail interface element 140 permits devices to be secured to the side of a weapon, adjacent to the upper receiver without interfering with the functions or handling of the weapon.

It is understood that the above-described embodiment is merely illustrative of the application. Other embodiments may be readily devised by those skilled in the art which will embody the principles of the invention and fall within the spirit and scope thereof.

I claim:

1. A modular sleeve for interfacing modular enhancements to a firearm, said firearm having minimally a receiver with a stock and barrel attached thereto, said barrel defining the forward portion of the firearm and said stock defining the rearward portion of the firearm, said firearm longitudinal axis being defined as horizontal and running from said stock through said receiver to said barrel, said receiver having a forward portion, a top and a rearward portion, said barrel being joined to the forward portion of the receiver, said stock being joined to the rearward portion of the receiver, comprising:

a universal receiver sleeve having a top side, an underside and two opposite sides connecting said top side with said underside, said universal receiver sleeve being further defined as having a forward portion and a rear portion, the underside of the rear portion of the universal receiver sleeve being fixedly attached to the firearm receiver top, said receiver sleeve forward portion extended forward above the firearm barrel;

an upper handguard piece having a front, rear, top, open bottom, opposing sides, outer side surfaces and inner side surfaces, said top, sides and bottom defining a hollow interior, said front and rear defining an upper handguard piece longitudinal axis, said upper handguard piece top being joined to the underside of the forward portion of the receiver sleeve;

a bottom handguard piece having a front, rear, open top, bottom, opposing sides, outer side surfaces and inner side surfaces, said bottom, sides and top defining a hollow interior, said front and rear defining a bottom handguard piece longitudinal axis, said bottom handguard piece being removably attached to the upper handguard piece;

wherein, said upper handguard piece and attached bottom handguard piece surround the firearm barrel without touching said barrel.

2. A modular sleeve as recited in claim 1, wherein:

each of the upper handguard side outer surfaces have two longitudinal channels formed therein, a large and shallow upper channel and a bottom interface channel, said bottom interface channel being positioned near to the upper hand guard piece bottom.

3. A modular sleeve as recited in claim 2, wherein:

each of the bottom handguard side outer surfaces have two longitudinal channels formed therein, a small and shallow upper channel and a larger, shallow bottom channel.

4. A modular sleeve as recited in claim 3, wherein:

the bottom hand guard inner side surfaces each have a longitudinal protrusion positioned near to the top, each protrusion being a mirror of the other;

wherein the bottom handguard piece is adapted to being joined to the upper handguard piece by sliding the bottom handguard longitudinal protrusion into the upper handguard bottom interface channel.

5. A modular sleeve as recited in [claim 4] *claim 1*, further comprising:

a plurality of apertures formed in the upper handguard piece; and a plurality of apertures formed in the lower handguard piece.

6. A modular sleeve as recited in [claim 5] *claim 3*, wherein:

said upper handguard interface channels and bottom handguard upper channel have corresponding cutout portions.

7. A modular sleeve as recited in [claim 6] *claim 1*, further comprising:

a plurality of spring-loaded connectors inserted through the bottom handguard piece sides near to the bottom handguard piece top, said connectors adapted to hold the top and bottom handguard pieces in a desired alignment.

8. A modular sleeve as recited in [claim 7] *claim 1*, wherein:

the top of the upper handguard piece and receiver sleeve forward portion are integrated into one piece, thereby forming a resulting upper handguard piece top, said resulting upper handguard piece top having an upper surface and an under surface.

9. A modular sleeve as recited in claim 8, further comprising:

a longitudinal gap in said resulting upper handguard piece top upper surface therein.

10. A modular sleeve as recited in claim 9, further comprising:

a hinging element fixed to the resulting upper handguard piece top upper surface at the upper handguard front;

an elongated interface element approximately equal to the said longitudinal gap, said elongated interface element adapted to pivotally join said hinging element.

11. A modular sleeve as recited in [claim 10] *claim 1*, further comprising:

a sleeve dovetail interface element adapted for engagement with the rear portion of the universal receiver sleeve rear portion, said sleeve dovetail interface element having an exterior horizontal surface with a unique cross-sectional dovetail shape adapted to attach ancillary equipment, and an opposite interior surface with a standard dovetail configuration for securing the universal receiver sleeve rear portion the receiver top.

12. A modular sleeve as recited in claim 11, further comprising:

a plurality of notches formed in the receiver top, each said notch having a rectangular cross section and being formed transverse to the longitudinal axis of the firearm;

an elongated rectangular opening formed in a first universal receiver sleeve opposite side, said rectangular opening extending from a universal received sleeve opposite side lower surface a predetermined distance toward the universal receiver top side and terminating in a rectangular opening upper edge, said rectangular opening upper edge having a plurality of rectangular notches formed therein;

a plurality of apertures formed in a second universal receiver sleeve opposite side, each said aperture being formed directly opposite a first universal received sleeve opposite side rectangular notch;

a plurality of projecting elements formed on the sleeve dovetail interface element interior surface, each said projecting element having a rectangular cross-section, said projecting elements adapted to engage the notches across the receiver top;

wherein, said sleeve dovetail interface element interior surface is adapted to engage said universal receiver sleeve opposite side elongated opening and the side of said receiver top;

wherein, said plurality of sleeve dovetail interface element interior surface projecting elements are adapted to engage said elongated rectangular opening rectangular notches, said receiver top notches and said plurality of apertures in said second received sleeve opposite side; and a plurality of nuts each adapted to engage a portion of a sleeve dovetail interface element interior surface projecting element projecting through each said aperture.

13. A modular sleeve as recited in claim 12, wherein:

the resulting upper handguard piece top upper surface is be formed into a male weaver type interface.

14. A modular sleeve as recited in claim 13, wherein:

the bottom handguard piece bottom is formed into a male weaver type interface.

15. A modular sleeve as recited in claim 14, wherein:

each upper handguard outer surface bottom interface channel has a general female, T-shaped cross section;

each bottom hand guard inner side surfaces protrusion has a T-shaped cross section.

16. A modular sleeve as recited in [claim 15] *claim 12*, further comprising:

a plurality of the apertures in the upper handguard piece and lower handguard piece have helicoils inserted therein, said helicoils being adapted for threaded engagement with a screw.

17. A modular sleeve as recited in [claim 16] *claim 12*, further comprising:

a plurality of external dovetail interface elements having an exterior horizontal surface with a cross-sectional dovetail shape adapted to attach ancillary equipment, and an opposite, generally flat, interior surface, said interior surface having a plurality of projecting elements, each projecting element having a T-shaped cross-section adapted to engage the cutout portions of said upper handguard interface channels and bottom handguard upper channels.

18. A modular sleeve as recited in claim 16, further comprising:

a plurality of apertures in said external dovetail interface elements, said apertures adapted to receive a screw.

*19. A system for attaching modular enhancements to a firearm, said firearm having a receiver, said receiver having a forward portion and a top, and a barrel joined to the forward portion of the receiver said system comprising:*

*a receiver sleeve having a top side, an underside, a forward portion and a rear portion, wherein the underside of the rear portion of the receiver sleeve is configured to be fixedly attached to the top of said firearm receiver and said forward portion of said receiver sleeve is configured to extend above at least a portion of the firearm barrel; and*

*a handguard piece depending directly from the underside of the forward portion of the receiver sleeve, said handguard piece having a continuous side wall that surrounds the firearm barrel along that portion of the firearm barrel along which said handguard piece extends without touching said firearm barrel when said receiver sleeve is attached to said firearm receiver.*

*20. A system for attaching modular enhancements to a firearm, said firearm having a receiver, said receiver having a forward portion and a top, and a barrel joined to the forward portion of the receiver said system comprising:*

*a receiver sleeve having a top side, an underside, a forward portion and a rear portion, wherein the underside of the rear portion of the receiver sleeve is configured to be fixedly attached to the top of said firearm receiver and said forward portion of said receiver sleeve is configured to extend above at least a portion of the firearm barrel; and*

*a handguard piece depending from the underside of the forward portion of the receiver sleeve, said handguard piece having a side wall that surrounds the firearm barrel without touching said barrel when said receiver sleeve is attached to said firearm receiver, and*

*wherein at least a portion of the handguard piece and the forward portion of the receiver sleeve are integrated into one piece.*

*21. The system of claim 19, wherein said top side of said receiver sleeve includes a dovetail interface element extending longitudinally along at least a portion of the top of the receiver sleeve, said dovetail interface element being configured and arranged for the mounting of ancillary equipment.*

*22. The system of claim 19, further comprising:*

*at least one external dovetail interface element arranged on the sidewall of said handguard piece, said external dovetail element being configured and arranged for the mounting of ancillary equipment.*

*23. The system of claim 22 wherein said at least one external dovetail interface element is removably secured to said sidewall of said handguard piece.*

*24. The system of claim 22, wherein said at least one external dovetail interface element comprises:*

*three external dovetail interface elements arranged on the sidewall of said handguard piece at 3:00, 6:00 and 9:00 positions.*

*25. The system of claim 24 wherein said external dovetail interface elements are removably secured to said sidewall of said handguard piece.*

*26. The system of claim 21, wherein said top side of said receiver sleeve further includes a plurality of apertures, each aperture adapted to threadedly receive a screw.*

*27. A system for attaching modular enhancements to a firearm, said firearm having a receiver, said receiver having a forward portion and a top, and a barrel joined to the forward portion of the receiver, said sleeve system comprising:*

*a receiver sleeve having a top side, an underside, a forward portion and a rear portion, wherein the underside of the rear portion of the receiver sleeve includes a receiver dovetail interface element for securing the receiver sleeve rear portion to the receiver top, said forward portion of said receiver sleeve extending above at least a portion of the firearm barrel;*

*a primary dovetail interface element extending longitudinally along at least a portion of the top of the receiver sleeve, said primary dovetail element being configured and arranged for the mounting of ancillary equipment;*

*a handguard piece depending from the underside of the forward portion of the receiver sleeve, said handguard piece having a side wall that surrounds the firearm barrel without touching said barrel when said receiver sleeve is attached to said firearm receiver; and*

*at least one secondary dovetail interface element arranged on the sidewall of said handguard piece, said secondary dovetail element being configured and arranged for the mounting of ancillary equipment.*

*28. The system of claim 27 wherein said at least one secondary dovetail interface element is removably secured to said sidewall of said handguard piece.*

*29. The system of claim 27, wherein said at least one secondary dovetail interface element comprises:*

*three secondary dovetail interface elements arranged on the sidewall of said handguard piece at 3:00, 6:00 and 9:00 positions.*

*30. The system of claim 29 wherein said secondary dovetail interface elements are removably secured to said sidewall of said handguard piece.*

*31. The system of claim 27, wherein said top side of said receiver sleeve further includes a plurality of apertures, each aperture adapted to threadedly receive a screw.*

*32. A system for attaching modular enhancements to a firearm, said firearm having a receiver, said receiver having a forward portion and a top, and a barrel joined to the forward portion of the receiver, said system comprising:*

*a receiver sleeve having a top side, an underside, a forward portion and a rear portion, wherein the underside of the rear portion of the receiver sleeve is configured to be fixedly attached to the top of said firearm*

*receiver and said forward portion of said receiver sleeve is configured to extend above at least a portion of the firearm barrel;*

*an upper handguard piece having opposing sidewalls depending from the underside of the forward portion of the receiver sleeve, said opposing sidewalls defining an open bottom and a hollow interior; and*

*a bottom handguard piece having opposing sidewalls extending upwardly, said sidewalls defining an open top and a hollow interior,*

*wherein said bottom handguard piece is configured to be removably attached to the upper handguard piece such that said upper handguard piece and said attached bottom handguard piece surround the firearm barrel without touching said barrel.*

*33. The system of claim 32, wherein each of said opposing sidewalls of said upper handguard includes a terminal edge with engagement formations, and each of said opposing sidewalls of said bottom handguard includes a terminal edge with complimentary engagement formations that matingly engage said engagement formations formed on said upper handguard.*

*34. The system of claim 33, wherein said one of said engagement formations and said complimentary engagement formations comprises a longitudinal channel and the other comprises a longitudinal protrusion wherein the bottom handguard piece is adapted to being joined to the upper handguard piece by sliding engagement of the longitudinal protrusion and the longitudinal channel.*

*35. The system of claim 34 wherein said longitudinal channel and said longitudinal protrusion have interrupted wall segments.*

*36. The system of claim 34, wherein the upper handguard includes said longitudinal channel and said bottom handguard includes said longitudinal protrusion.*

*37. The system of claim 36 wherein said longitudinal channel and said longitudinal protrusion have interrupted wall segments.*

*38. A system for attaching modular enhancements to a firearm, said firearm including a receiver having a forward portion and a top, and further including a barrel joined to the forward portion of the receiver, said system comprising:*

*a receiver sleeve having a top, an underside, a forward portion and a rear portion wherein the underside of the rear portion of the receiver sleeve is configured and arranged to be fixedly received over the top of said receiver, and said forward portion of said receiver sleeve is configured to extend in spaced relation above at least a portion of the barrel of the firearm;*

*a dovetail interface extending longitudinally along at least a portion of the top of the receiver sleeve; and*

*a handguard piece fixedly attached to the forward portion of the receiver sleeve such that the handguard is not movable relative to the receiver sleeve and having walls that depend downwardly and outwardly from opposing sides of the forward portion of said receiver sleeve such that said walls at least partially surround the barrel without touching the barrel.*

*39. The system of claim 38, further comprising:*

*at least one external dovetail interface extending longitudinally along an outside surface of said wall of said handguard.*

*40. A system for attaching modular enhancements to a firearm, said firearm including a receiver having a forward portion and a top, and further including a barrel joined to the forward portion of the receiver, said system comprising:*

*a receiver sleeve having a top, an underside, a forward portion and a rear portion wherein the underside of the rear portion of the receiver sleeve is configured and arranged to be fixedly received over the top of said receiver, and said forward portion of said receiver sleeve is configured to extend in spaced relation above at least a portion of the barrel of the firearm;*

*a dovetail interface extending longitudinally along at least a portion of the top of the receiver sleeve;*

*a substantially tubular handguard having an upper portion that is fixedly attached to the forward portion of the receiver sleeve such that the handguard is not movable relative to the receiver sleeve, said handguard further having a lower portion that depends downwardly from said upper portion such that said upper and lower portions cooperate to define a hollow interior cavity that at least partially surrounds the barrel without touching the barrel; and*

*at least one external dovetail interface extending longitudinally along an outside surface of said handguard.*

*41. A system for attaching modular enhancements to a firearm, said firearm including a receiver having a forward portion and a top, and further including a barrel joined to the forward portion of the receiver, said system comprising:*

*a receiver sleeve having a top, an underside, a forward portion and a rear portion wherein the underside of the rear portion of the receiver sleeve is configured and arranged to be fixedly received over the top of said receiver, and said forward portion of said receiver sleeve is configured to extend in spaced relation above at least a portion of the barrel of the firearm;*

*a dovetail interface extending longitudinally along at least a portion of the top of the receiver sleeve;*

*an upper handguard piece attached to the forward portion of the receiver sleeve, said upper handguard piece having opposing side walls that depend downwardly and outwardly from opposing sides of the forward portion of said receiver sleeve such that said side walls at least partially encircle the barrel without touching the barrel;*

*said side walls each having a terminal edge with engagement formations for receiving an accessory having complimentary mating engagement formations.*

*42. The system of claim 41, further comprising:*

*an accessory having opposing side walls that extend upwardly and outwardly from opposing side edges thereof, said side walls having a terminal edge with complimentary mating engagement formations.*

*43. The system of claim 42, wherein said accessory comprises a lower handguard portion and wherein said upper handguard portion and said lower handguard portion surround the barrel without touching the barrel when assembled.*

*44. A system for attaching modular enhancements to a firearm, said firearm having a receiver and a barrel joined to a forward portion of the receiver, said system comprising:*

*an upper handguard piece having a dovetail interface extending longitudinally along at least a portion of the top thereof, said upper handguard piece further having opposing sidewalls depending downwardly from an underside of said dovetail interface, said opposing sidewalls defining an open bottom and a hollow interior;*

*means for removably securing said upper handguard piece to said receiver; and*

*a bottom accessory piece having opposing sidewalls extending upwardly, said sidewalls defining an open top and a hollow interior,*

*wherein said bottom accessory piece is configured to be removably attached to the upper handguard piece such that said upper handguard piece and said attached bottom accessory piece surround the firearm barrel without touching said barrel.*

*45. The system of claim 44, wherein each of said opposing sidewalls of said upper handguard piece includes a terminal edge with engagement formations, and each of said opposing sidewalls of said bottom accessory piece includes a terminal edge with complimentary engagement formations that matingly engage said engagement formations formed on said upper handguard piece.*

*46. The system of claim 45, wherein said one of said engagement formations and said complimentary engagement formations comprises a longitudinal channel and the other comprises a longitudinal protrusion, wherein the bottom accessory piece is adapted to being joined to the upper handguard piece by sliding engagement of the longitudinal protrusion and the longitudinal channel.*

*47. The system of claim 46 wherein said longitudinal channel and said longitudinal protrusion have interrupted wall segments.*

*48. The system of claim 46, wherein the upper handguard piece includes said longitudinal channel and said bottom accessory piece includes said longitudinal protrusion.*

*49. The system of claim 48 wherein said longitudinal channel and said longitudinal protrusion have interrupted wall segments.*

*50. The system of claim 44 further comprising at least one secondary dovetail interface element arranged on the sidewall of said lower accessory piece, said secondary dovetail element being configured and arranged for the mounting of ancillary equipment.*

*51. The system of claim 50 wherein said at least one secondary dovetail interface element is removably secured to said sidewall of said bottom accessory piece.*

*52. The system of claim 50, wherein said at least one secondary dovetail interface element comprises three secondary dovetail interface elements arranged on the sidewall of said bottom accessory piece at 3:00, 6:00 and 9:00 positions.*

*53. The system of claim 52 wherein said secondary dovetail interface elements are removably secured to said sidewall of said bottom accessory piece.*

*54. The system of claim 44 wherein said bottom accessory piece comprises a bottom handguard piece.*

* * * * *

UNITED STATES PATENT AND TRADEMARK OFFICE

CERTIFICATE OF CORRECTION

PATENT NO. : RE40,216 E
APPLICATION NO. : 10/811795
DATED : April 8, 2008
INVENTOR(S) : Richard E. Swan It is certified that error appears in the above-identified patent and that said Letters Patent is hereby corrected as shown below:

On the Title Page

Insert

Item (63) --US Application No. 11516801, filed September 6, 2006 which is a divisional of US Application No. 10811795;--

--US Application No. 12716013, filed March 2, 2010 which is a divisional of US Application No. 11516801.--

Signed and Sealed this
Twenty-fourth Day of February, 2015

Michelle K. Lee

Michelle K. Lee
*Deputy Director of the United States Patent and Trademark Office*

US00RE40216C1

(12) INTER PARTES REEXAMINATION CERTIFICATE (0210th)

United States Patent

Swan

(10) Number: US RE40,216 C1

(45) Certificate Issued: Nov. 30, 2010

(54) MODULAR SLEEVE

(76) Inventor: Richard E. Swan, 171 West St., East Bridgewater, MA (US) 02333

Reexamination Request:
No. 95/000,370, May 21, 2008

Reexamination Certificate for:

| | |
|---|---|
| Patent No.: | **Re. 40,216** |
| Issued: | **Apr. 8, 2008** |
| Appl. No.: | **10/811,795** |
| Filed: | **Mar. 29, 2004** |

Related U.S. Patent Documents

Reissue of:

| | |
|---|---|
| (64) Patent No.: | **6,490,822** |
| Issued: | **Dec. 10, 2002** |
| Appl. No.: | **10/007,590** |
| Filed: | **Dec. 10, 2001** |

Related U.S. Application Data

(60) Provisional application No. 60/274,147, filed on Mar. 9, 2001.

(51) Int. Cl.
*F41C 23/00* (2006.01)

(52) U.S. Cl. ..... 42/71.01; 42/75.01; 42/124

(58) Field of Classification Search ..... None
See application file for complete search history.

(56) References Cited

U.S. PATENT DOCUMENTS

| | | | | | |
|---|---|---|---|---|---|
| 4,845,871 | A | * | 7/1989 | Swan | 42/127 |
| 5,142,806 | A | * | 9/1992 | Swan | 42/114 |
| 5,198,600 | A | * | 3/1993 | E'Nama | 42/90 |
| 5,343,650 | A | * | 9/1994 | Swan | 42/117 |
| 5,533,292 | A | * | 7/1996 | Swan | 42/123 |
| 5,590,484 | A | * | 1/1997 | Mooney et al. | 42/111 |

* cited by examiner

*Primary Examiner*—Jeffrey R. Jastrzab

(57) ABSTRACT

A Swan universal receiver sleeve attached to the top of a firearm upper receiver and extended forward above the firearm barrel to a position just short of the firearm front sight. The underside of the rear portion of the sleeve is fixedly attached to the receiver top. The underside of the forward portion of the sleeve has an upper handguard piece attached thereto. A bottom handguard piece is fitted about the bottom of the gun barrel and is attached to the upper handguard piece. The handguard pieces are not physically connected in any way to the gun barrel. The sleeve is self supported by the connection of the rear portion underside to the receiver top.

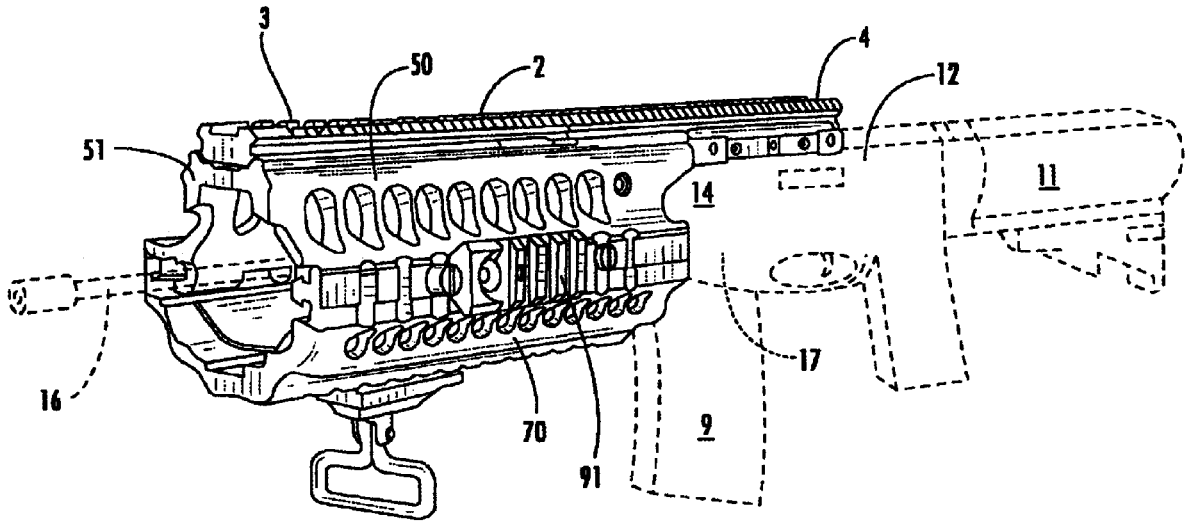

(AMENDED)

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the original patent, but was deleted by the reissue patent; matter printed in italics was added by the reissue patent. Matter enclosed in heavy double brackets [[ ]] appeared in the reissue patent but is deleted by this reexamined certificate; matter printed in boldface is added by this reexamination certificate.

AS A RESULT OF REEXAMINATION, IT HAS BEEN DETERMINED THAT:

The patentability of claims 1 and 19-40 is confirmed.

Claims 41 and 44 are determined to be patentable as amended.

Claims 42, 43 and 45-54, dependent on an amended claim, are determined to be patentable.

Claims 2-18 were not reexamined.

*41. A system for attaching modular enhancements to a firearm, said firearm including a receiver having a forward portion and a top, and further including a barrel joined to the forward portion of the receiver, said system comprising:*

*a receiver sleeve having a top, an underside, a forward portion and a rear portion wherein the underside of the rear portion of the receiver sleeve is configured and arranged to be fixedly* [[received over]] attached to *the top of said receiver, and said forward portion of said receiver sleeve is configured to extend in spaced relation above at least a portion of the barrel of the firearm;*

*a dovetail interface extending longitudinally along at least a portion of the top of the receiver sleeve;*

*an upper handguard piece attached to the forward portion of the receiver sleeve, said upper handguard piece having opposing side walls that depend downwardly and outwardly from opposing sides of the forward portion of said receiver sleeve such that said side walls at least partially encircle the barrel without touching the barrel;*

*said side walls each having a terminal edge with the engagement formations for receiving an accessory having complimentary mating engagement formations.*

*44. A system for attaching modular enhancements to a firearm, said firearm* [[having]] including *a receiver* having a top *and* further including *a barrel joined to a forward portion of the receiver, said system comprising:*

*an upper handguard piece having a dovetail interface extending longitudinally along at least a portion of the top thereof, said upper handguard piece further having opposing sidewalls depending downwardly from an underside of said dovetail interface, said opposing sidewalls defining an open bottom and a hollow interior;* sleeve *means for* [[removably securing]] fixedly attaching *said upper handguard piece to said* top of said *receiver; and*

*a bottom accessory piece having opposing sidewalls extending upwardly, said sidewalls defining an open top and a hollow interior,*

*wherein said bottom accessory piece is configured to be removably attached to the upper handguard piece such that said upper handguard piece and said attached bottom accessory piece surround the firearm barrel without touching said barrel.*

* * * * *